United States Patent [19]
Vogt et al.

[11] Patent Number: 4,822,098
[45] Date of Patent: Apr. 18, 1989

[54] DOUBLE-WALLED STRUCTURAL BODY PANEL FOR MOTOR VEHICLE

[75] Inventors: Hans Vogt, Overath, Fed. Rep. of Germany; Malcom H. Russell, Upminster, Great Britain; Richard C. McKechnie, Hoourheide, Netherlands; Derek F. Gentle, Birmingham, Mich.

[73] Assignee: Ford Motor Company, Dearborn, Mich.

[21] Appl. No.: 117,714

[22] Filed: Nov. 4, 1987

[30] Foreign Application Priority Data

Nov. 5, 1986 [DE] Fed. Rep. of Germany ....... 3637622

[51] Int. Cl.4 .......................................... B62D 25/12
[52] U.S. Cl. ..................................... 296/901; 296/76; 296/201
[58] Field of Search ............... 296/31 P, 76, 191, 188, 296/146

[56] References Cited

U.S. PATENT DOCUMENTS 3,781,059 12/1973 Davis ..................................... 296/76
4,433,866  2/1984 Hagiwara .............................. 296/76

FOREIGN PATENT DOCUMENTS 0111457 6/1984 European Pat. Off. .
3245710 11/1983 Fed. Rep. of Germany .
3236166 1/1984 Fed. Rep. of Germany .

OTHER PUBLICATIONS

"Automobil-Revue", No. 36, p. 3, dated Aug. 29, 1985.

Primary Examiner—Robert R. Song
Attorney, Agent, or Firm—Peter D. McDermott; Roger L. May

[57] ABSTRACT

A double-walled, plastic, structural body panel for motor vehicles, such as a door or tailgate, comprises an outer part and an inner part, both preferably injection-molded of a thermoplastic synthetic material, which are joined together along edge areas. Both the outer edge areas (4) and the inner edge areas (5) have adjacent flat joining areas (7/8 and 9/10, respectively). A web or flange (11 and 12, respectively) extends approximately at right angles to the adjacent flat joining areas. An adhesion coating (6) or an adhesion welding joint is formed at the adjacent flat joining areas.

10 Claims, 6 Drawing Sheets

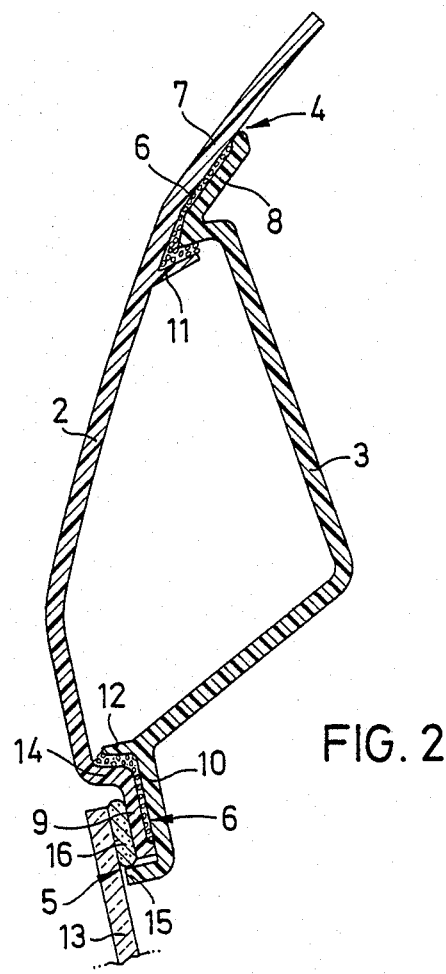
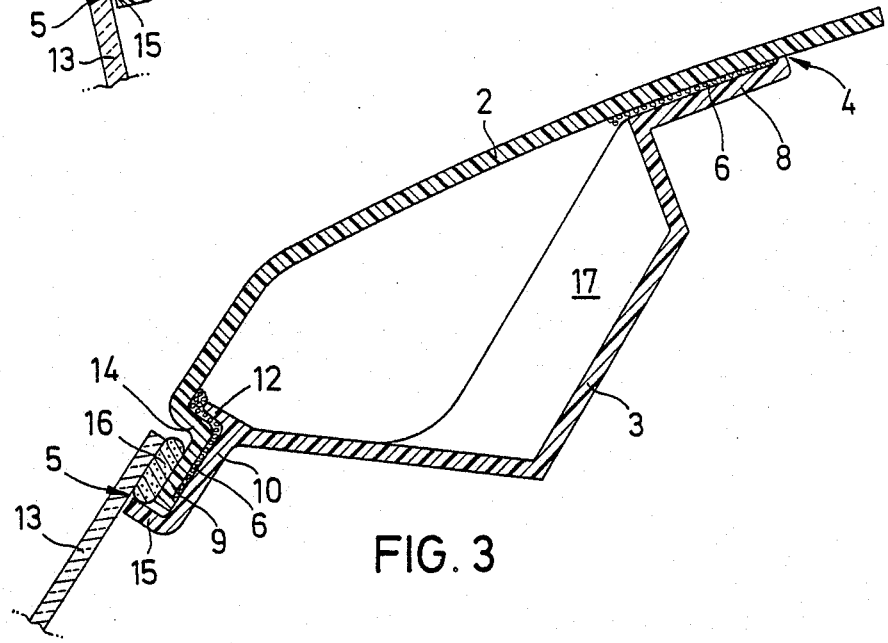
FIG. 2
FIG. 3

DOUBLE-WALLED STRUCTURAL BODY PANEL FOR MOTOR VEHICLE

The present invention relates to a double-walled, plastic, structural body panel for motor vehicles, especially a motor vehicle door or tailgate.

A double-walled, plastic, structural body panel for motor vehicles, in particular a tailgate construction member, is disclosed in the magazine "Automobil-Revue" (Automobile Review) No. 36, Aug. 29, 1985. In this body panel in outer part, injection-moulded from a thermoplastic synthetic material, and an inner part are glued together by a so-called hot sinking process. A hot sinking process of this type is relatively complicated and expensive and is consequently not ideally suited for use in mass production.

A double-walled, plastic, structural body panel for motor vehicles, in particular a tailgate, is known from European Patent Application No. 0.111.457, in which an outer part, injection-moulded from a thermoplastic synthetic material, is provided with a plurality of reinforcement ribs and is joined to a similar inner part by screws only in a lower region. This body panel has the disadvantage that it is only single-walled in its upper frame regions and it must consequently be provided with metal reinforcement parts for receiving the hinge and support fittings of the tailgate.

Other plastic tailgate members with an inner part with a channel-shaped cross-section are known from German Pat. No. 32 36 166 and German Offenlegungsschrift (Laid-Open Specification No. 32 45 710. Therein, the inner part is supplemented by gluing it to an outer part, which is formed essentially by a corresponding glass pane, to form a double-walled, structural body panel. In the case of these known plastic tailgates, the outer part, constructed as a glass pane, limits the possibilities of styling the tailgate to a considerable extent.

The object of the present invention is to provide a double-walled, plastic, structural body panel for motor vehicles, in particular a door or tailgate, comprising an outer member and an inner member, both preferably injection molded from thermoplastic synthetic material, joined to one another with a simple adhesion or adhesion welding process and forming a double-walled body panel of such strength that the need for metal reinforcement often is avoided.

According to the invention, a double-walled, plastic, structural body panel for motor vehicles, in particular for example, a door or tailgate, comprises an outer member and an inner member. An outer edge area of the outer member comprises a first flat joining area and an outer edge area of the inner member comprises a second flat joining area corresponding to the aforesaid first flat joining area. An inner edge area of the outer member comprises a third flat joining area and inner edge area of the inner member comprises a fourth flat joining area corresponding to the aforesaid third flat joining area. The outer member and the inner member are joined together at their outer edge areas, at which they touch one another, by an adhesion joint formed by and between the aforesaid first and second flat joining areas. The outer member and the inner member also are joined together at their inner edge areas, at which they also touch one another, by a second adhesion joint formed by and between the third flat joining area and the fourth flat joining area. The outer edge area of either the outer member or the inner member further comprises a web or flange extending approximately at right angles to the flat joining area thereof and substantially parallel and proximate an inner surface of the other one of the outer member and inner member. The inner edge area of one of the outer member and inner member also comprises a web or flange extending approximately at right angles to the flat joining area thereof and substantially parallel and proximate an inner surface of the other one of the outer member and inner member.

By virtue of the fact that at both the inner edge and the outer edge the edge area of either the outer member or the inner member comprises a flat joining region with an adjacent web region, a wide, open channel cross-section for applying an adhesion material is provided. This permits a virtually trouble-free orientation of the outer member to the inner member and permits excess adhesive to flow out into the edge areas. After the joint is formed, it can be subjected to shear loading not only in the direction of the plane of the two members but also in a direction at right angles thereto.

According to a preferred embodiment, the body panel incorporates a window. Flat edge areas on the outer member are recessed in the region of window devices by depressions continuing around the periphery of the window opening. Flat edge areas on the inner member are recessed and are embraced by an edge web. The adhesive joint of the glass pane is recessed and the glass pane lies externally flush with the body panel surface. The edge web forms a stop edge for the glass pane and an internal visual covering for the adhesive joint.

According to another preferred embodiment, the body panel incorporates a lock device and the inner member provides a frustro-conical depression in the region of the lock device. That is, the inner member forms a funnel, the diameter decreasing in the direction toward the outer member. The inner member further provides a lock cylinder receiving means and comprises a sleeve attachment which extends concentrically to the lock cylinder receiving means and which together with the lock cylinder receiving means engages the outer member in a centering manner. Continuous surface regions, which lie parallel to the inner surface of the outer member and which are additionally joined to the outer member, for example by adhesive, are provided on the inner member. In this way, partial areas of the body panel under greater stress are expediently reinforced, so that additional plate reinforcements often can be dispensed with.

According to another preferred embodiment, the body panel incorporates a windshield wiper motor and the inner member provides a shaft receiving boss forming concentric regions in the manner of a funnel, the diameter decreasing in the direction toward the outer member. The inner member further provides a wiper shaft receiving member and continuous surface areas which lie parallel to the inner surface of the outer member and by way of which it is joined by adhesive to the outer member. In this way, a highly stressed region of the body panel can be reinforced so securely that sheet holders for the windscreen wiper motor often can be dispensed with.

According to another preferred embodiment, the body panel incorporates an outwardly projecting hinge part, which is formed by a plurality of bracket clips and which is supported by way of reinforcement webs extending in the channel-shaped region of the inner member. In this way, the application of metal fittings, including screws, nuts and the like, often can be dispensed with for the hinge device.

According to another preferred embodiment, the body panel is a motor vehicle tailgate and incorporates a pneumatic spring device. On the inner member a plurality of support webs are formed in the channel-shaped region of the said inner member, at right angles to an inner wall, parallel to which extends the anchoring means of a support fitting for the pneumatic spring device. Here, too, the necessary absorption of force often can be ensured without metallic reinforcement. Additional features and advantages of the invention will be understood from the following discussion.

The invention is described in greater detail with reference to exemplary embodiments illustrated in the drawings, in which FIG. 1 is a perspective view of a tailgate according to the invention, showing the sections which are used to explain the different connection regions;

FIG. 2 is a section along the line II—II in FIG. 1;

FIG. 3 is a section along the line III—III in FIG. 1;

Figure 1:
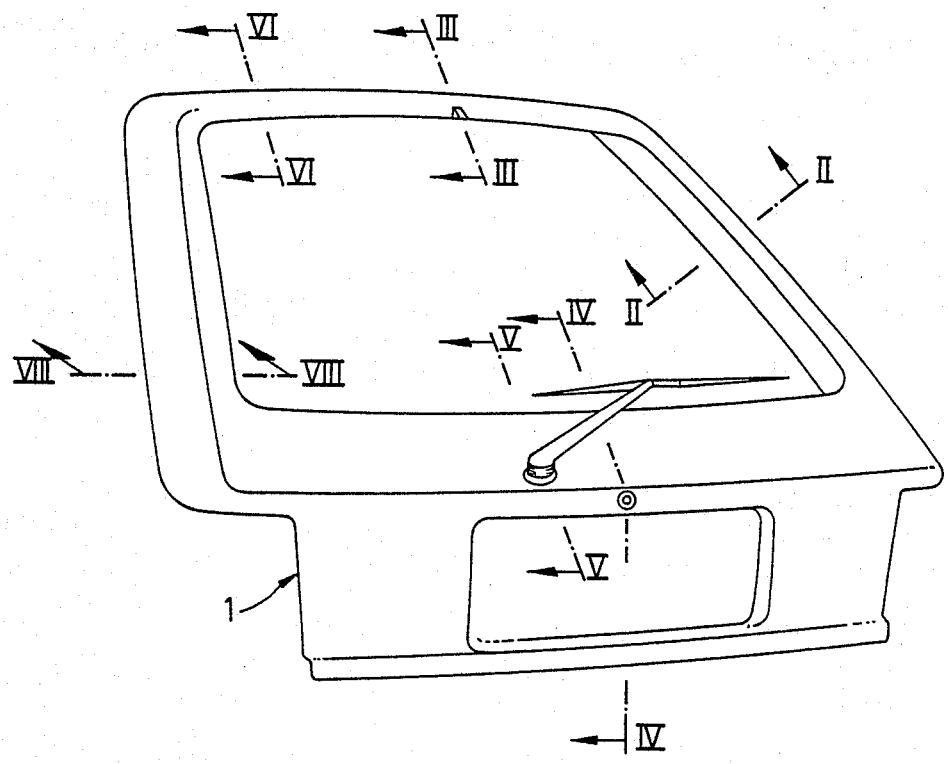

Referring now to the drawings, the tailgate 1 of a motor vehicle is shown in FIGS. 1 and 2 to comprise an outer member 2, preferably injection-moulded from thermoplastic synthetic material, and an inner member 3 produced in the same way. The outer member 2 has an essentially smooth shape, as generally is desired for the external profile of a body panel, while the inner member has a channel-shaped cross-section, typically of varying shape and dimensions.

The two members, the outer member 2 and the inner member 3, are joined together at an adhesion joint comprising an adhesive coating 6 or an adhesion welding joint at outer edge area 4 at or near their outer peripheries and at inner edge area 5 at or near their inner peripheries, the said edge areas being adjacent one another. More specifically, the outer edge area 4 of the outer member 2 has a flat joining area 7. The outer edge area 4 of the inner member 3 has a corresponding flat joining area 8. Similarly, the inner edge area 5 of the outer member 2 has a flat joining area 9 and the inner member 3 at the inner edge area 5 has a corresponding flat joining area 10. An adhesion joint is formed by and between the flat joining areas at the inner edge and another is formed by and between those at the outer edge.

A web region is provided on one of the members at each joint adjacent the flat joining areas. Thus, in the body panel shown, outer member 2 provides web 11 adjacent external edge area 4 and inner member 3 provides web 12 adjacent internal edge area 5. The flat joining areas 7 and 10 in conjunction with the web regions 11 and 12, respectively, provide wide receiving spaces for applying the adhesive needed to form the adhesive coating 6, but sufficient freedom is retained between the outer member 2 and the inner member 3 to afford relatively trouble-free orientation of the outer member 2 and the inner member 3 relative to one another. In addition, on account of the substantial width of the joining areas, it is possible to ensure that the required oscillation of the edge areas of the two members can be achieved, for example for producing a friction adhesion welding joint. In the same way, the use of ultrasonic adhesion welding joints is possible.

The inner edge area 5 on the outer member 2 and on the inner member 3 are adapted for receiving a window pane 13. To this end the joining area 9 of the outer member 2 provides a depression 14 which extends around the periphery of the window opening. The joining area 10 of the inner member 3 provides edge web 15 which comprises a flange extending around the periphery of the window opening and embracing the joining area 10, and, more generally, the internal edge area 5. That is, inner edge area 5 provides the aforesaid web 12 and also edge web 15 which form, together with flat inner area 10, a channel which receives the aforesaid depression. A recessed space is thereby formed, relative the plane of the outside surface of outer member 2, for the application of the adhesive 16 for the pane 13, whereby pane 13 lies substantially flush with the outside surface of outer member 2. The edge web 15 forms both a stop edge for pane 13 and a sight shield, that is, an inner visual covering for the adhesive joint 16.

FIG. 3 again shows the window 13 in the region of the joint at internal edge area 5 between the outer part 2 and the inner part 3. Reinforcement ribs 17 which extend at right angles to the inner part 3 are shown in the channel-shaped cross-section of the inner member 3.

Figure 4:
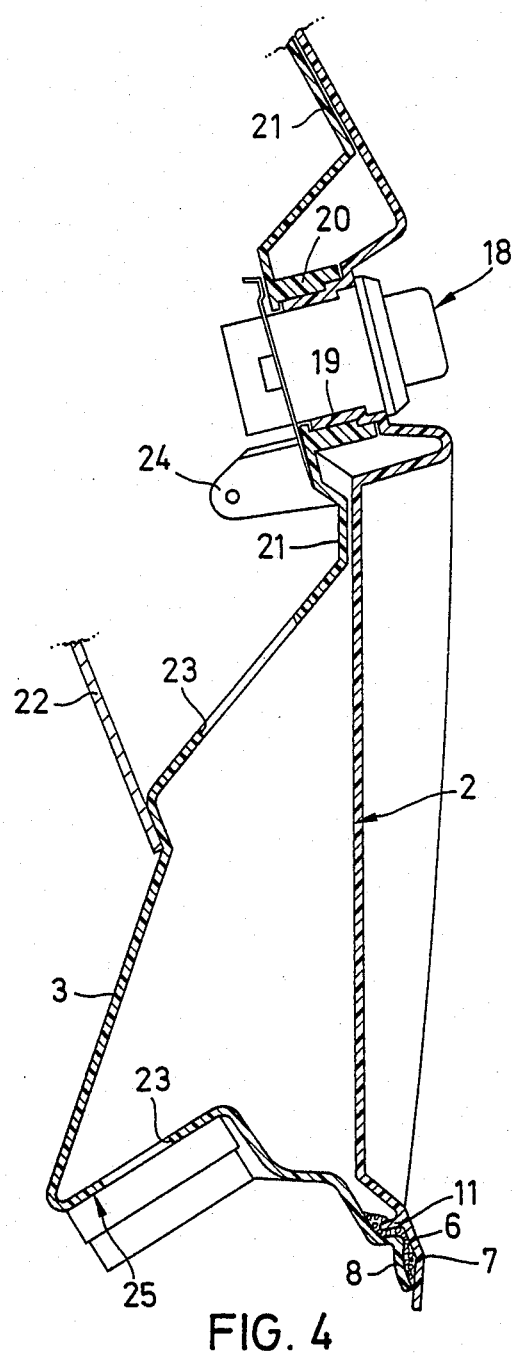
FIG. 4 is a section along the line IV—IV in FIG. 1.

FIG. 4 shows the body panel in the region of a lock device 18. In this connection, the outer member 2 is provided with a lock cylinder receiving means 19. The inner member 3 provides a frustro-conical depression, that is, is formed in the manner of a funnel, the diameter decreasing toward the outer member 2. Inner member 3 comprises a sleeve attachment 20 at the general area of the apex of such frustro-conical area. The sleeve attachment 20 registers with and extends concentrically to the lock cylinder receiving means 19. The registration of the sleeve attachment with the lock cylinder receiving means 19 serves to properly position the outer member 2 and the inner member 3 with respect to one another. The two members optionally are glued or welded at the lock area. Surface areas 21 lie at the periphery of the aforesaid frustro-conical depression in inner member 3. They are adjacent and parallel to the inner surface of the outer member 2. By means of these surface areas 21, optionally, the inner member 3 can be additionally joined to the outer member 2 by an adhesive coating or by adhesion welding. The funnel-shaped depression in the inner member 3 can be covered toward the interior of the vehicle by means of a cardboard cover 22.

Access openings 23 for the introduction of actuating rods and brackets 24 and receiving means 25 for the actuating and locking devices can of course be provided on the inner member 3. In addition, such bracket 24 for mounting an actuating rod system can be integrally moulded on the inner member 3 adjacent the sleeve attachment 20.

The joint between the outer member 2 and the inner member 3, as shown in FIG. 4, by way of the mutually engaging sleeve portions, the lock cylinder receiving means 19 and the sleeve attachment 20, forms a secure protection for the lock cylinder against attempts to break in by forcing in the lock cylinder.

Figure 5:
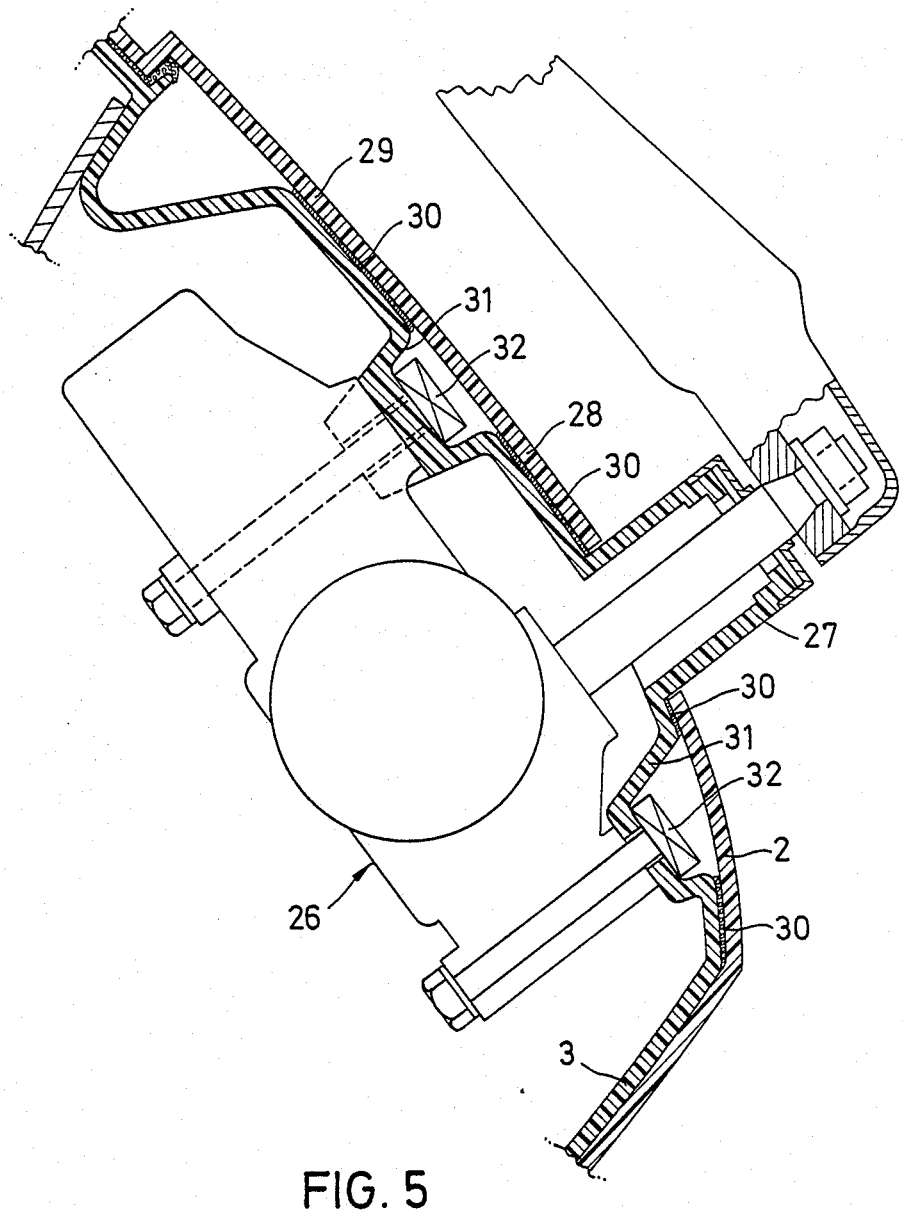
FIG. 5 is a section along the line V—V in FIG. 1.

FIG. 5 shows the outer member 2 in conjunction with the inner member 3 in the region of a window wiper motor device 26. In this connection, the inner member 3 provides a wiper shaft receiving means 27 in an area shaped like a funnel, the diameter decreasing in the direction toward the outer member 2. It provides two approximately concentric areas 28 and 29 parallel to the inner surface of the outer member 2 and is joined to the outer member 2 by an adhesive coating 30 or by adhesion welding. Receiving means 31 for fastening screws 32 of the wiper motor device 26 can expediently be provided between the essentially concentric areas 28 and 29. On account of the direct fastening of the wiper motor 26 to the inner member 3, sound insulation is less required then in prior known constructions.

Figure 6:
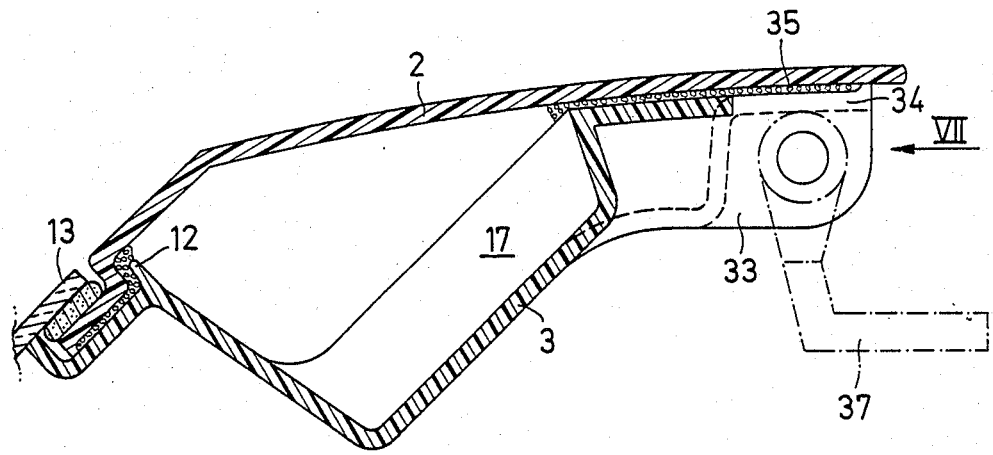
FIG. 6 is a section along the line VI—VI in FIG. 1.
Figure 7:
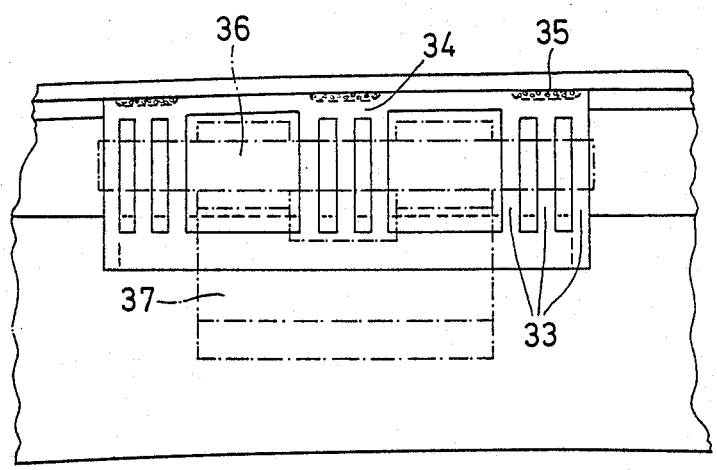
FIG. 7 is an elevation in the direction of the arrow VII in FIG. 6.

The design of the hinge device of the tailgate is shown in FIGS. 6 and 7. The inner member 3 provides a plurality of bracket clips 33, which are connected to one another by a base 34 and are joined to the outer member 2 by an adhesive coating 35 or an adhesion welding joint. These bracket clips 33 can be connected by way of a normal hinge pin 36 to a conventional hinge fitting 37 which can be secured in conventional manner to the body of the motor vehicle.

Figure 8:
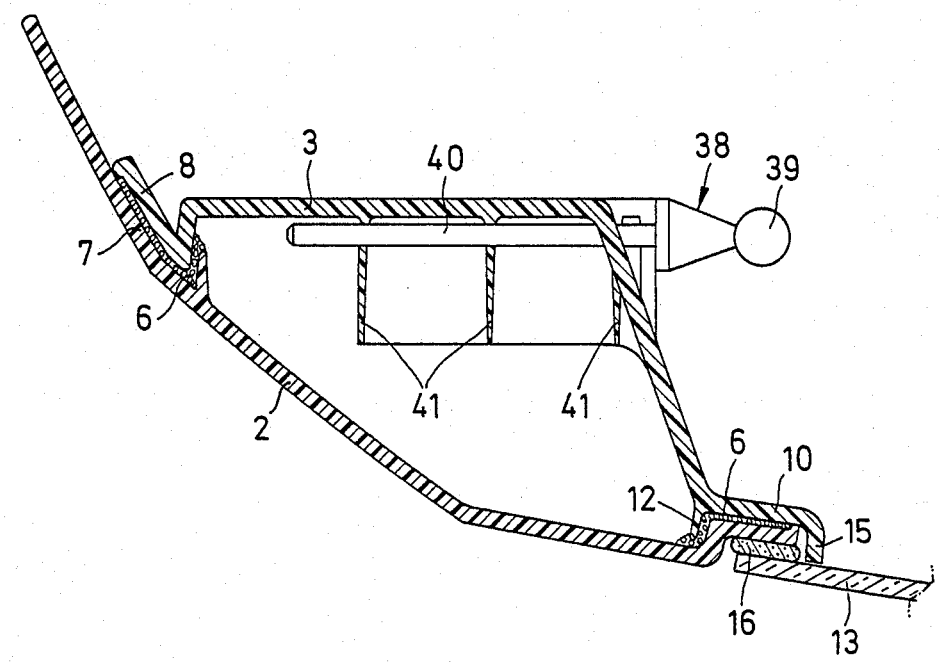
FIG. 8 is a section along the line VIII—VIII in FIG. 1.

FIG. 8 shows the fastening of a support fitting 38 for a pneumatic spring for the tailgate of the motor vehicle. The support fitting 38 comprises a ball end 39 and a mandrel or pin attachment 40, the surface of which can be milled, indented, provided with a thread or otherwise roughened. The fitting 38 is secured by hot sinking or screwing to support webs 41 extending from the inner wall of the inner member 3 at right angles thereto. The last mentioned steps for securing hinge and support fittings, the details of which are known per se to those persons skilled in the art of plastic, structural body panels, enables a reduction in the use of metal reinforcement construction members.

Optionally, the cavity between the inner member and the outer member can be at least partially filled with foam according to methods well known to the skilled of the art.

We claim:

1. A double-walled, plastic, structural body panel for a motor vehicle, comprising an outer member and an inner member, an outer edge area of the outer member comprising a first flat joining area, an outer edge area of the inner member comprising a second flat joining area corresponding to said first flat joining area, an inner edge area of the outer member comprising a third flat joining area, and an inner edge area of the inner member comprising a fourth flat joining area corresponding to said third flat joining area, aid outer member and said inner member being joined together at said outer edge areas by an adhesion joint formed by and between said first flat joining area and said second flat joining area, and at said inner edge areas by a second adhesion joint formed by and between said third flat joining area and said fourth flat joining area, wherein the outer edge area of one of said outer member and inner member further comprises a web extending approximately at right angles to said flat joining area thereof and substantially parallel to and proximate an inner surface of the other one of said outer member and inner member, and wherein the inner edge area of one of said outer member and said inner member further comprises a second web extending approximately at right angles to said flat joining area thereof and substantially parallel to and proximate an inner surface of the other one of said outer member and inner member.

2. The double-walled, plastic, structural body panel according to Claim 1, wherein said third flat joining area is recessed to form a depression extending around the periphery of a window opening, said inner edge area of said inner member comprises said second web and further comprises an edge web, said second web and edge web together with said fourth flat joining area forming a channel which receives said depression, an adhesive window joint between a glass pane and said body panel is formed in said depression, said glass pane being substantially flush with an exterior surface of said body panel, and said edge web is a stop for said glass pane and a sight shield for said adhesive window joint.

3. The double-walled, plastic, structural body panel according to claim 1, further comprising a means for locking said body panel, said means comprising a frustro-conical depression in said inner member, the diameter thereof decreasing toward said outer member, an outwardly extending sleeve formed by said inner member substantially at the apex of said frustro-conical depression and a lock cylinder receiving means comprising an inwardly extending sleeve which is formed by said outer member and which is received concentrically within and registers with said outwardly extending sleeve.

4. The double-walled, plastic, structural body panel according to claim 3, wherein said inner member further comprises a substantially planar surface area at the periphery of said frustro-conical depression, which planar surface area is immediately adjacent and parallel to a corresponding inner surface of said outer member, an adhesion joint existing between said planar surface area and said corresponding inner surface.

5. The double-walled, plastic, structural body panel according to claim 1, further comprising windshield wiper mounting means comprising a depression in said inner member extending outwardly toward said outer member, said inner member forming a wiper shaft receiving sleeve extending outwardly from approximately the center of said depression, and said inner member further forming substantially planar, approximately concentric surface areas within the perimeter of said depression, which planar surface areas are immediately adjacent and parallel to corresponding inner surface areas of said outer member, an adhesion joint existing between each of said planar surface areas and a corresponding one of said corresponding inner surface areas.

6. The double-walled, plastic, structural body panel according to claim 1, further comprising:
   (A) hinge means for receiving a hinge fitting connected to the motor vehicle, said hinge means comprising a clip base unitary with said inner member and a plurality of bracket clips unitary with said clip base and projecting therefrom in a direction away from said outer member, a surface of said clip base opposite said bracket clips forming an adhesive joint with an inner surface said outer member; and
   (B) reinforcement webs strengthening said hinge means, said reinforcement webs being unitary with said inner member and extending from a surface thereof facing said outer member between said outer edge areas and said inner edge areas, and extending traversely to a channel between said inner member and said outer member.

7. The double-walled, plastic, structural body panel according to claim 1, further comprising fitting support means for receiving a fitting adapted to attach a pneumatic spring thereto, said support means comprising a plurality of support webs unitary with said inner member and extending from a surface thereof facing said outer member between said outer edge areas and said inner edge areas, and extending longitudinally within a channel between said inner member and said outer member.

8. The double-walled, plastic, structural body panel according to claim 1, wherein a plurality of reinforcement webs integral with said outer member extend from a surface thereof facing said inner member, between said outer edge areas and said inner edge areas, in a longitudinally curved section of a channel between said inner member and said outer member.

9. The double-walled, plastic, structural body panel according to claim 1, wherein a cavity between said inner member and said outer member is at least partially filled with foam.

10. A double-walled, plastic, structural body panel for a motor vehicle, comprising an outer member and an inner member, an outer edge area of the outer member comprising a first flat joining area, an outer edge area of the inner member comprising a second flat joining area corresponding to said first flat joining area, an inner edge of the outer member comprising a third flat joining area, and an inner edge area of the inner member comprising a fourth flat joining area corresponding to said third flat joining area, said outer member and said inner member being joined together at said outer edge areas by an adhesion joint formed by and between said first flat joining area and said second flat joining area, and at said inner edge areas by a second adhesion joint formed by and between said third flat joining area and said fourth flat joining area, wherein the outer edge area of said outer member further comprises a web extending approximately at right angles to said flat joining area thereof and substantially parallel to and proximate an inner surface of said inner member, and wherein the inner edge area of said inner member further comprises a second web extending approximately at right angles to said flat joining area thereof and substantially parallel to and proximate an inner surface of said outer member.

* * * * *